UNITED STATES PATENT OFFICE.

ELLERSLIE E. LUTHER AND WILLIAM H. VOLCK, OF WATSONVILLE, CALIFORNIA.

PROCESS OF MAKING ARSENATE OF LEAD.

No. 903,389.

Specification of Letters Patent.

Patented Nov. 10, 1908.

Application filed July 10, 1907. Serial No. 382,995.

*To all whom it may concern:*

Be it known that we, ELLERSLIE E. LUTHER and WILLIAM H. VOLCK, both citizens of the United States, residing at Watsonville, in the county of Santa Cruz and State of California, have invented new and useful Improvements in Processes of Making Arsenate of Lead, of which the following is a specification.

Our invention relates to a process for the manufacture of arsenate of lead.

Our process is carried out as follows: A combining weight of white lead or basic lead carbonate, and a combining weight of arsenic acid in solution, are held in suspension in water, and the reaction produces the arsenate of lead. The combining weight of arsenic acid may vary from the proportion of one part of the anhydrid of arsenic acid to 1.938 parts of lead oxid, to the proportion of one part of the anhydrid of arsenic acid to 2.9 parts of lead oxid. The latter proportion will produce as its result, orthoarsenate of lead, with small traces of pyroarsenate of lead, which is due to the slight acidity of the solution during the reaction. The lesser proportion results in pyroarsenate of lead. The proportions varying between the two will result in mixtures of the above mentioned arsenates.

In this process there are two principal reactions, 1st, the formation of orthoarsenate of lead; and 2nd, the formation of pyroarsenate of lead.

The reactions taking place are as follows:

[1st.—$2PbCO_3Pb(OH)_2 + 2H_3AsO_4 =$
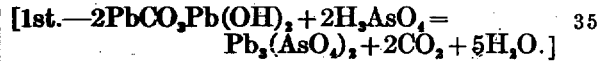
$Pb_3(AsO_4)_2 + 2CO_2 + 5H_2O.$]

[2nd.—$2Pb_3(AsO_4)_2 + 2H_3AsO_4 =$
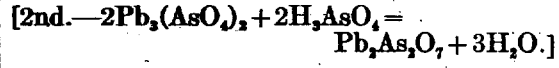
$Pb_2As_2O_7 + 3H_2O.$]

As is readily seen the second reaction is affected by the addition of more arsenic acid to the first, the primary.

In practice, the formation of orthoarsenate of lead is accompanied by a slight amount of the second reaction due to the fact that the reaction becomes what is termed localized, that is, a greater concentration of arsenic acid in one part of the tank beyond the amount required to form orthoarsenate of lead. This in fact is somewhat analogous to acid salts.

Having thus described our invention, what we claim and desire to secure by Letters Patent is—

The process of making arsenate of lead, which consists in reacting with arsenic acid in solution, upon basic lead carbonate held in suspension, these reagents being present in the proportions of their combining weights.

In testimony whereof we have hereunto set out hands in presence of two subscribing witnesses.

ELLERSLIE E. LUTHER.
WILLIAM H. VOLCK.

Witnesses:
L. F. BUCKHART,
A. T. PORTER.